(12) United States Patent
Lin

(10) Patent No.: US 8,072,848 B2
(45) Date of Patent: Dec. 6, 2011

(54) ADAPTATION DEVICE FOR HARD DISK DRIVE

(75) Inventor: Chien-Chung Lin, Sanchong (TW)

(73) Assignee: Cremax Tech. Co., Ltd., Taipei County (TW)

( * ) Notice: Subject to any disclaimer, the term of this patent is extended or adjusted under 35 U.S.C. 154(b) by 422 days.

(21) Appl. No.: 12/436,811

(22) Filed: May 7, 2009

(65) Prior Publication Data

US 2010/0097912 A1 Apr. 22, 2010

(30) Foreign Application Priority Data

Oct. 21, 2008 (TW) ................................ 97218762 U

(51) Int. Cl.
*G11B 7/085* (2006.01)
*G11B 33/02* (2006.01)

(52) U.S. Cl. .............. 369/30.03; 369/75.11; 361/679.37

(58) Field of Classification Search ............... 369/30.03, 369/75.11, 30.83, 30.42, 30.39; 360/99.08, 360/92.1; 361/680, 684, 679.37, 679.34, 361/679.06

See application file for complete search history.

(56) References Cited

U.S. PATENT DOCUMENTS

| | | | | |
|---|---|---|---|---|
| 6,172,867 | B1 * | 1/2001 | Satou et al. | 361/679.06 |
| 7,719,790 | B2 * | 5/2010 | Armagost et al. | 360/92.1 |
| 7,782,565 | B2 * | 8/2010 | Starr | 360/92.1 |

* cited by examiner

*Primary Examiner* — Ali Neyzari
(74) *Attorney, Agent, or Firm* — Leong C. Lei

(57) ABSTRACT

An adaptation device includes a lower casing member including a connection interface and forming a bottom slot in a front bottom, at least one retention flange on side walls, and pivot receiving holes in rear portions of the side walls. A retention board forms a connection interface receiving opening in a front end, rotation shafts on a rear end, and pawls on a bottom. The shafts are movably received in shaft slots defined in a rotary board. Pivots are formed below the shaft slots for being received in pivot receiving holes defined in the lower casing member. The rotary board has a hold-down plate. With a hard disk drive placed on the retention board and connected to a connection interface, the cover and the rotary board are closed forward to have the hold-down plate holding down the hard disk drive. The cover is then moved backward for fixation.

4 Claims, 4 Drawing Sheets

ADAPTATION DEVICE FOR HARD DISK DRIVE

(a) TECHNICAL FIELD OF THE INVENTION

The present invention generally relates to an adaptation device for a hard disk drive, wherein the hard disk drive is positioned on a retention board and is fixed by a resilient hold-down plate and is further connected to a connection interface, so as to firmly hold the hard disk drive between a lower casing member and a cover, whereby efficient connection and mounting/dismounting of hard disk drives of various sizes can be realized.

(b) DESCRIPTION OF THE PRIOR ART

To cope with fast processing of digital data and exchange of information, a desktop computer or a notebook computer uses a hard disk drive, which may require frequent connection and mounting/dismounting. Particularly, the hard disk drive of the desktop computer or notebook computer is housed inside a computer enclosure and different computers use hard disk drives of different sizes. To perform mass data exchange, elaborated and complicated operations have to be carried out for connecting and mounting/dismounting of the hard disk drives. This is not only troublesome to the operation of data exchange but also consumes valuable time. It is thus desired to have a fixation structure that allows for efficient mounting/dismounting and is applicable to hard disk drives of different sizes.

SUMMARY OF THE INVENTION

In view of the above problems, the present invention aims to provide an adaptation device for a hard disk drive, which allows for efficient mounting/dismounting of the hard disk drive and is applicable to hard disk drives of different sizes in order to improve operation efficiency.

In accordance with the present invention, an adaptation device is provided for a hard disk drive, wherein a retention board that forms a connection interface receiving opening is fixed by engaging bottom slots defined in a lower casing member. Rotation shafts formed on a rear end of the retention board are slidably and rotatably received in extended shaft slots defined in a rotary board. A cover forms rotary board slide rails to slidably receive side edges of a rotary board. When a hard disk drive of a different size is placed on the retention board and is connected to a connection interface provided on the lower casing member, the cover and the rotary board are closed forward to have a hold-down plate arranged on the rotary board holding down a top of the hard disk drive. The cover is then moved backward to engage and thus be fixed under retention flanges formed on the lower casing member. In this way, the hard disk drive can be connected efficiently. The present invention simplifies the elaborate and complicated process of replacing a hard disk drive and thus improving the operation efficiency.

The foregoing objective and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
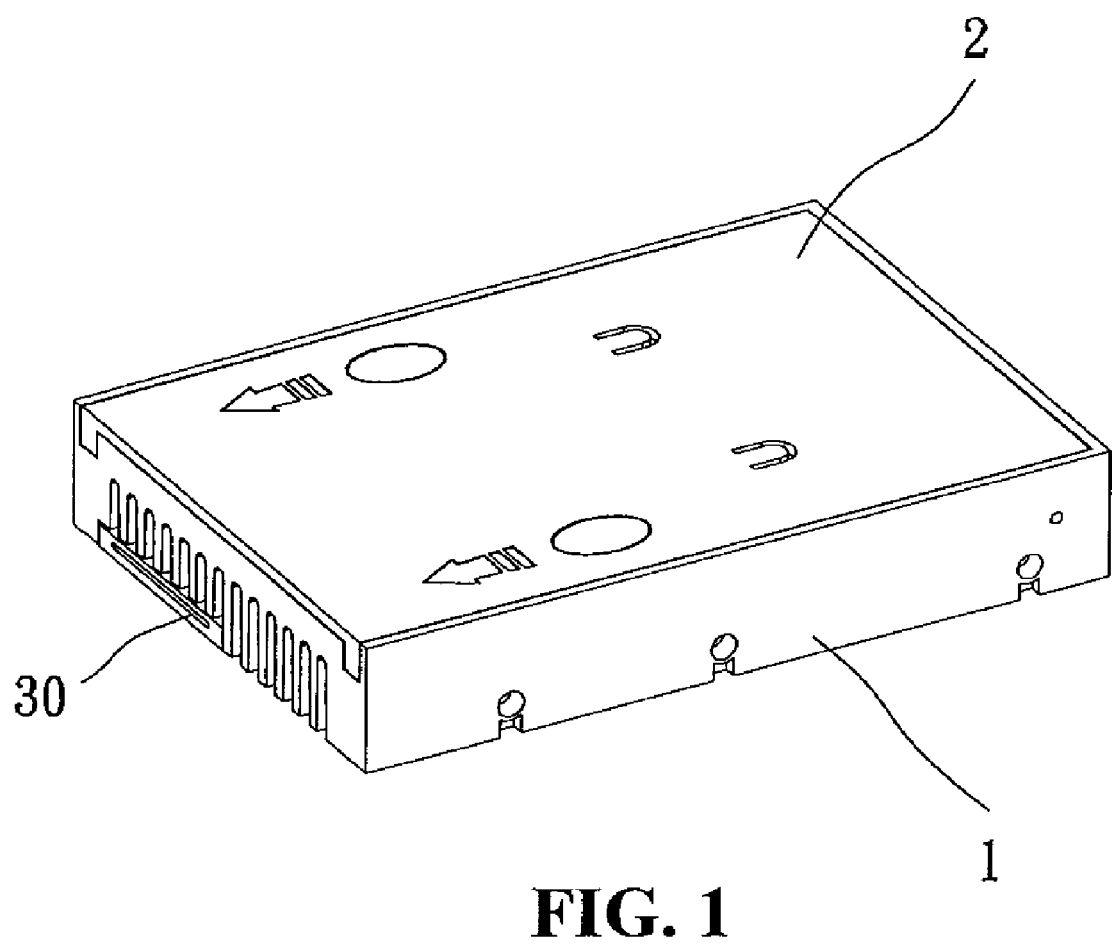
FIG. 1 is a perspective view of the present invention.
Figure 2:
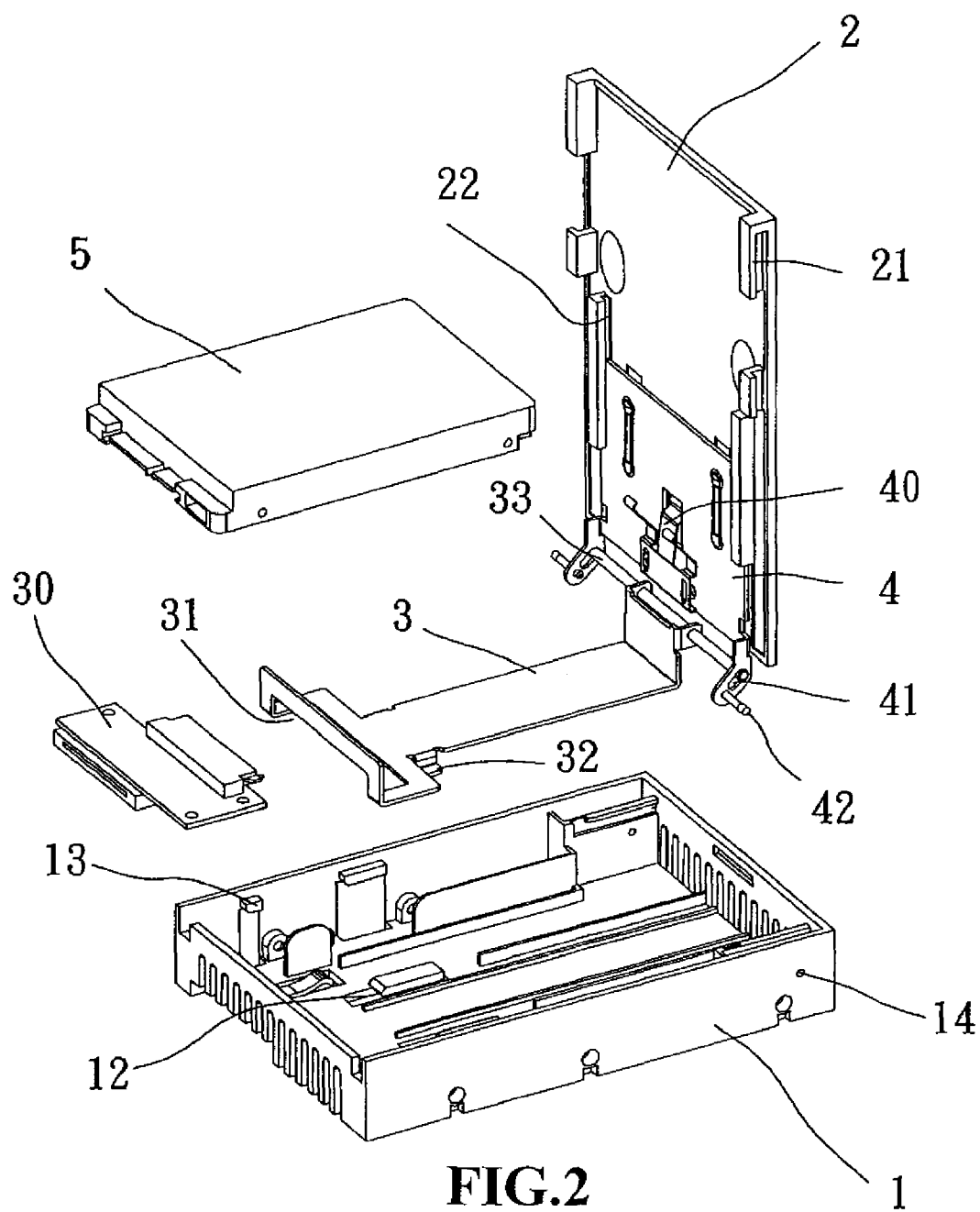
FIG. 2 is an exploded view of the present invention.
Figure 3:
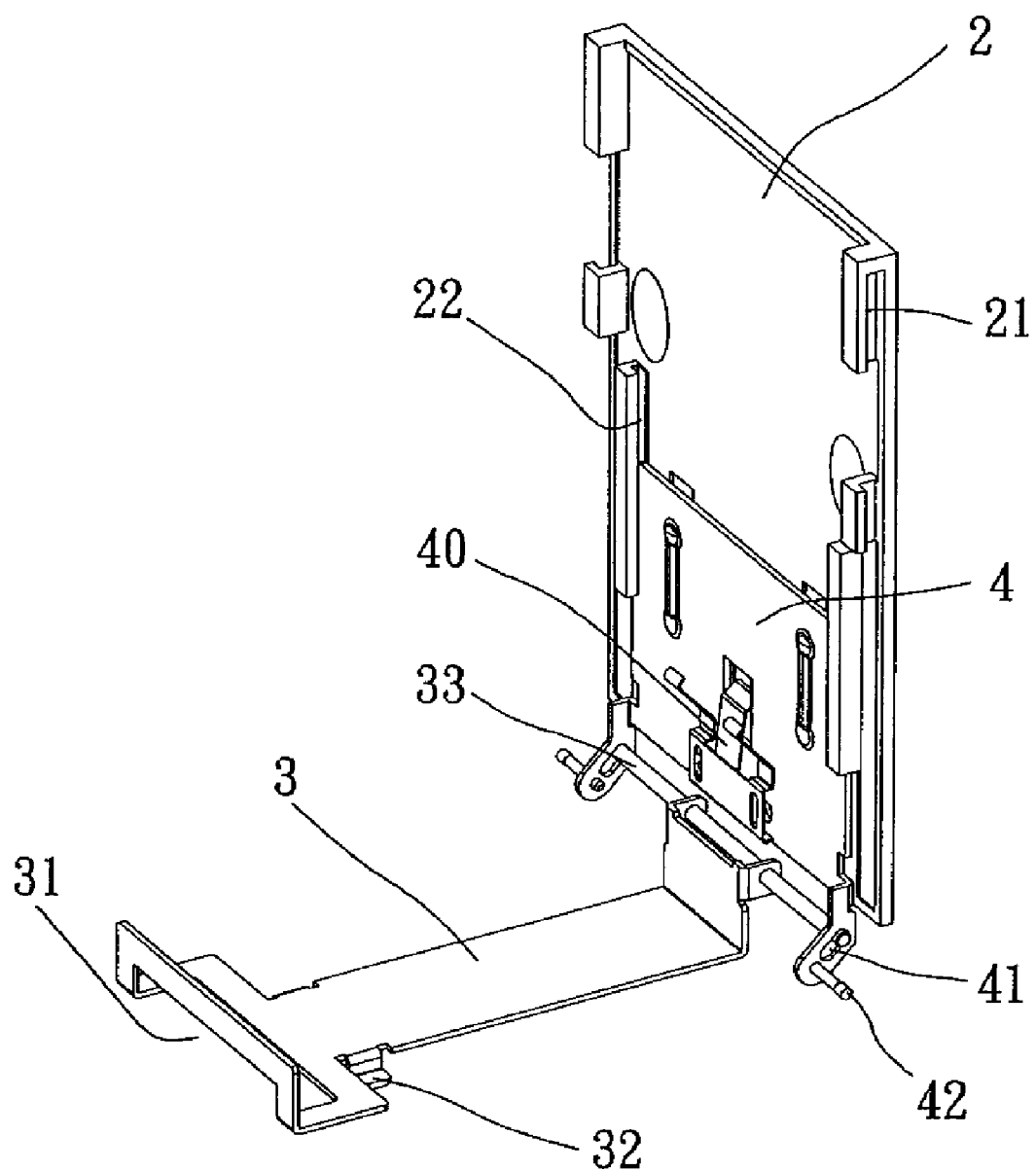
FIG. 3 is a perspective view of the present invention with a lower casing member removed.

The present invention provides an adaptation device for a hard disk drive. As shown in FIGS. 1-3, the adaptation device comprises a lower casing member 1, a cover 2, a retention board 3, a rotary board 4, and the hard disk drive 5.

As shown in FIGS. 1-4, positional relationship among the components of the adaptation device will be described in details. The lower casing member 1 comprises a connection interface 30 and forms a bottom slot 12 in a front portion of a bottom thereof, at least one retention flange on side walls thereof, and pivot receiving holes 14 in rear portions of the side walls. The retention board 3 forms a connection interface receiving opening 31 in a front end thereof, rotation shafts 33 on a rear end, and pawls 32 on a bottom thereof. The rotation shafts 33 are slidably and rotatably received in extended shaft slots 41 defined in the rotary board 4. Pivots 42 are formed below the shaft slots 41 for being rotatably received in the pivot receiving holes 14 defined in the lower casing member 1. The rotary board 4 comprises a hold-down plate 40. The cover 2 forms rotary board slide rails 22 that cooperate the rotary board 4 to allow the cover 2 and the rotary board 4 to be closed forward through the rotation shafts 33 and the pivots 42 cooperating with the shaft slots 41.

Figure 4:
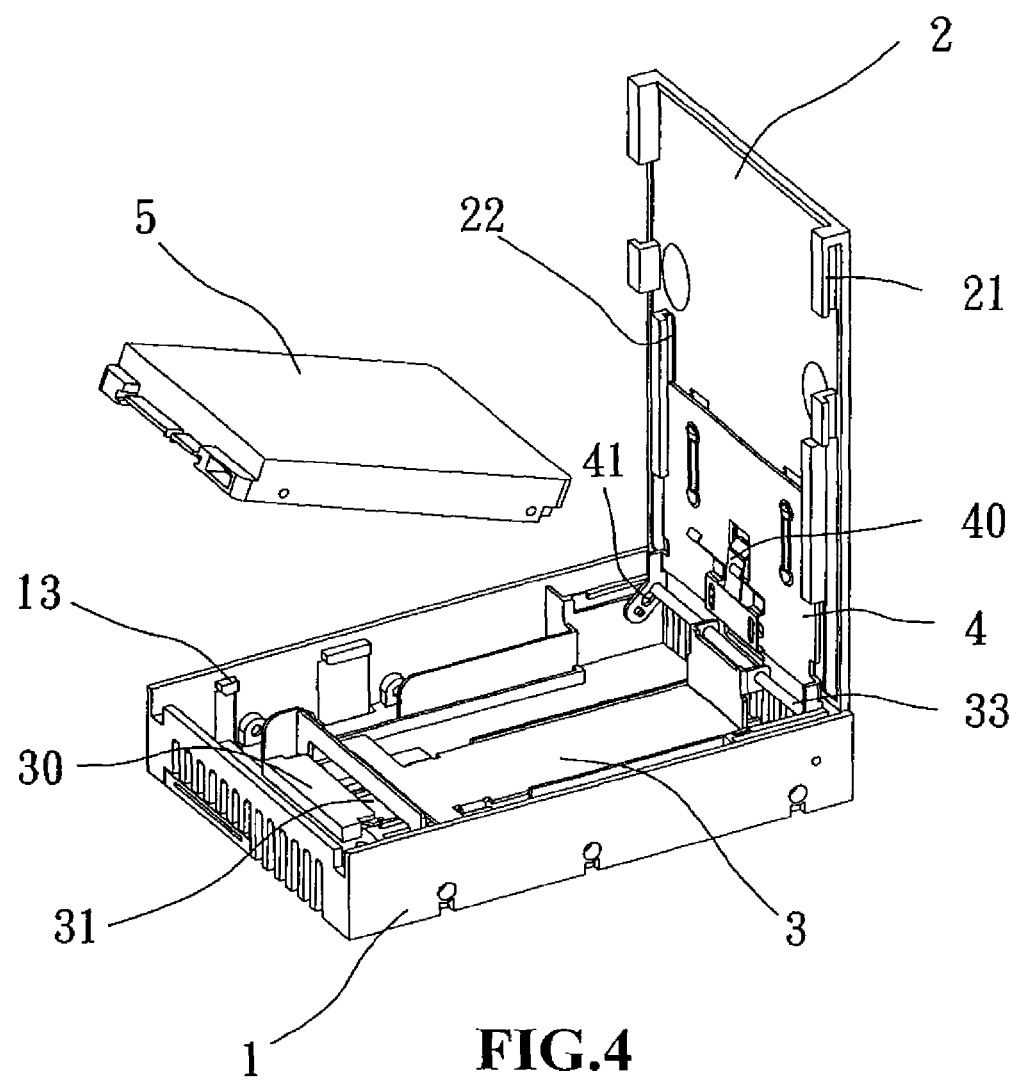
FIG. 4 is a perspective view of the present invention illustrating mounting/dismounting of a hard disk drive.

Referring to FIGS. 3 and 4, the present invention mounts a Serial ATA (SATA) interfaced 2.5 inch or 3.5 inch hard disk drive 5 on the retention board 3 with the hard disk drive 5 connected to the connection interface 30. When the cover 2 and the rotary board 4 are closed forward, a hold-down plate 40, which is composed of a resilient member, holds down a top of the hard disk drive 5. The cover 2, after being set projecting forward through the rotary board slide rails 22 cooperating the rotary board 4, can moved backward to have cover slide rails 21 engaging and fixed under the retention flanges 13 of the lower casing member 1. To replace the hard disk drive 5, the cover 2 is moved forward to have the cover slide rails 21 disengaging from the retention flanges 13 for exposing and replacing the hard disk drive 5. This provides efficient connection and mounting/dismounting of hard disk drives of various sizes.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An adaptation device for a hard disk drive, comprising:
   a lower casing member, which comprises a connection interface and forms a bottom slot in a front portion of a bottom thereof, retention flanges on side walls thereof, and pivot receiving holes in rear portions of the side walls;
   a retention board, which functions to size-adjustably hold the hard disk drive and forms a connection interface receiving opening in a front end thereof, rotation shafts on a rear end, and a pawl on a bottom thereof to engage the bottom slot of the lower casing member;
   a rotary board, which comprises a hold-down plate and has a rear end forming extended shaft slots for slidably and rotatably receiving the rotation shafts of the retention board, the rotary board further forming pivots below the shaft slots for being rotatably received in the pivot receiving holes of the lower casing member; and
   a cover, which forms rotary board slide rails and cover slide rails, the cover slide rails being receivingly engageable the retention flanges of the lower casing member, the rotary board slide rails being engageable with side edges of the rotary board;
   wherein the hard disk drive is connected to the connection interface and wherein the cover and the rotary board are closed forward through the rotation shafts of the retention board and the pivots of the rotary board cooperating with the shaft slots to have the hold-down plate holding down a top of the hard disk drive, and then the cove is moved backward to be fixed under the retention flanges of the lower casing member.

2. The adaptation device according to claim 1, wherein the hold-down plate provided on the rotary board comprises a resilient member.

3. The adaptation device according to claim 1, wherein the connection interface received in the connection interface receiving opening of the retention board comprises an advanced serial based peripheral device.

4. The adaptation device according to claim 1, wherein the retention board is operable with the rotary board to hold down a 2.5 inch or 3.5 inch hard disk drive.

* * * * *